May 16, 1933.   A. NEVEU   1,909,377
BRAKE AND DOOR CONTROL APPARATUS
Filed June 30, 1930
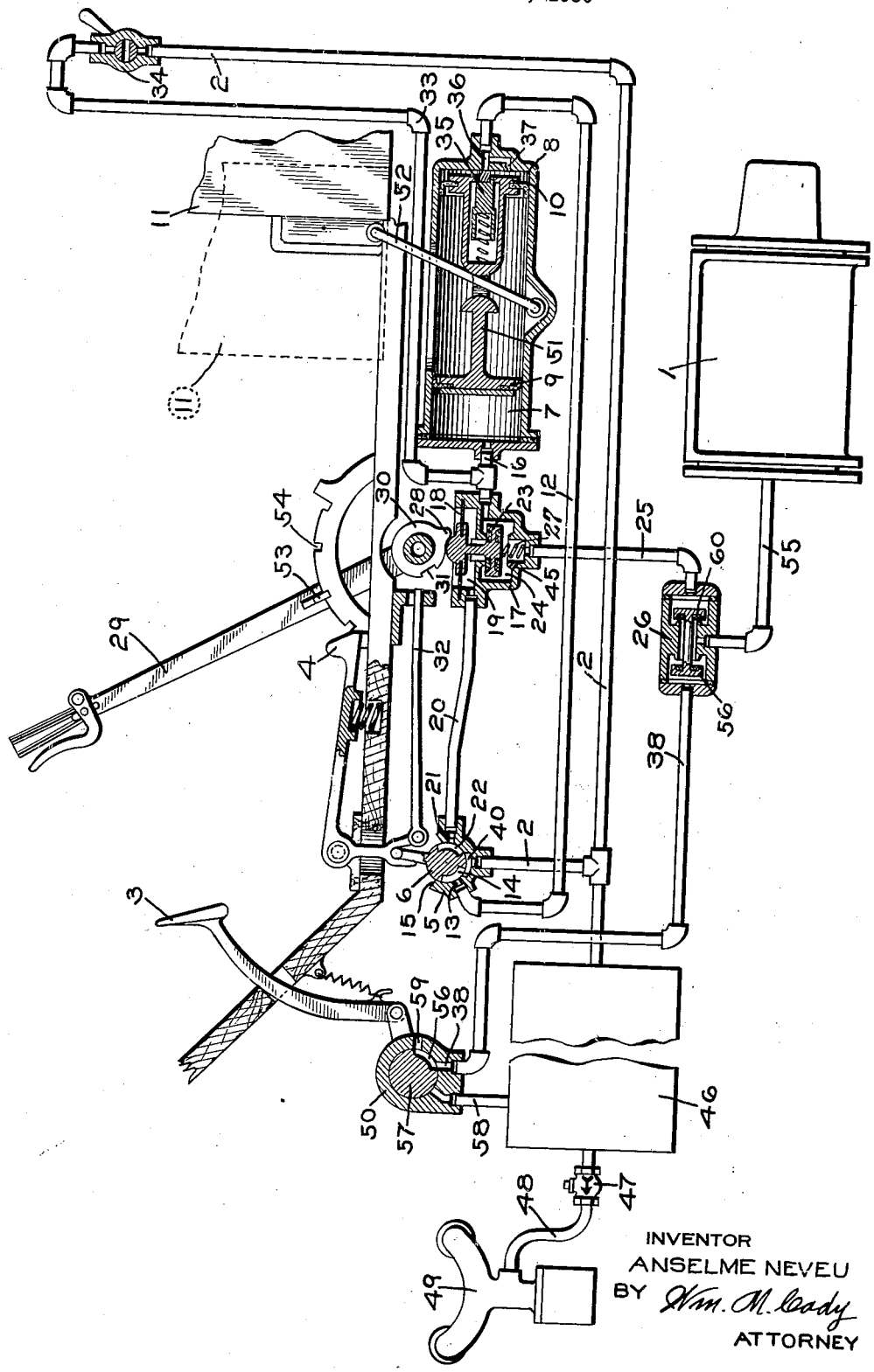
INVENTOR
ANSELME NEVEU
BY Wm. M. Cady
ATTORNEY Patented May 16, 1933                                         1,909,377

UNITED STATES PATENT OFFICE

ANSELME NEVEU, OF LIVRY GARGAN, (SEINE ET OISE), FRANCE, ASSIGNOR TO WESTINGHOUSE AIR BRAKE COMPANY, OF WILMERDING, PENNSYLVANIA, A CORPORATION OF PENNSYLVANIA

BRAKE AND DOOR CONTROL APPARATUS

Application filed June 30, 1930, Serial No. 464,793, and in Great Britain July 10, 1929.

This invention relates to brake and door control apparatus for an automotive vehicle and particularly of the motor coach type in which the driver is the only attendant and has for its principal object to provide an improved apparatus of this character.

Another object of my invention is to provide a vacuum controlled safety control equipment in which an automatic application of the bakes will be effected and the vehicle door or doors will be automatically unlocked or balanced in the event of the incapacitation of the operator.

Another object is to provide a vacuum safety control equipment which is normally under the control of an operator of the vehicle and which may be controlled by a passenger for effecting an application of the brakes and the unlocking or balancing of the door or doors of the vehicle.

A further object is to provide a vacuum controlled safety control equipment for an automotive vehicle, which equipment embodies means whereby the brake and door control apparatus are interlocked with a change speed or gear shift lever in such a manner that said lever cannot be moved from its neutral position until the equipment is caused to operate to close the door or doors of the vehicle.

Other objects and advantages will appear in the following more detailed description of my invention.

In the accompanying drawing, the single figure is a diagrammatic view, mainly in section, of a safety control equipment embodying my invention.

Referring now in detail to the drawing, the braking equipment of the vehicle comprises the usual vacuum brake cylinder 1 or cylinders adapted to be placed in communication with the usual induction pipe or intake manifold 49 of the engine by way of a brake cylinder pipe 55, past the unseated check valve 56 of the double check valve device 26, through pipe and passage 38, a cavity 56 in the rotary valve 57 of the brake valve device 50 when the brake pedal 3 is depressed, a pipe 58, a vacuum reservoir 46, a check valve device 47 and a pipe 48, so as to effect vacuum braking. Upon the release of the pedal, under normal conditions, fluid at atmospheric pressure is admitted to the brake cylinder 1 to release the brakes through a passage 59 in the brake valve device 50, cavity 56 in the rotary valve 57, passage and pipe 38, past the unseated check valve 56 and through pipe 55.

An additional or safety pedal 4 is also provided adapted to be engaged by the heel of the driver under normal conditions of running, this pedal being arranged to operate a rotary valve or cock device hereinafter termed the door controlling valve device. The latter comprises the usual valve casing 5 containing a rotary valve 6 and is so arranged that the latter is set in one or other of its two operative positions according to whether the safety pedal 4 is depressed or released. The equipment also comprises a door engine consisting of a pair of axially aligned cylinders 7 and 8, each containing a piston, the two pistons 9 and 10 being mounted at the ends of a common piston rod 51 which is mechanically coupled to the door 11 or doors of the vehicle through the medium of a pivoted rod 52 or any other desired means. The door 11 is arranged to be opened and closed respectively by establishing communication between one or other of the cylinders 7 and 8 and the induction pipe of the engine through the pipe 2, that cylinder which is not thus subject to vacuum being connected to the atmosphere.

The cylinder 8 which, when subject to vacuum, effects the closing of the door 11 or doors, is connected by means of a suitable pipe 12 to a port 13 in the door valve casing 5, which when the safety pedal 4 is released communicates through a suitable cavity 14 in the rotary valve 6 of the door controlling valve device with an atmospheric port 15, whereas when the safety pedal 4 is depressed, the pipe 12 leading to this cylinder is placed in communication through the cavity 14 of the door controlling valve device and pipe 2 with the induction pipe or intake manifold 49 of the engine.

The other cylinder 7 of the door engine, that is to say, the cylinder which when subject to vacuum conditions effects the opening of the door 11 or doors, is connected by means of a pipe 16 with a valve device 17 hereinafter termed the control valve device. The latter comprises a diaphragm 18 which in the present embodiment of the invention is horizontally disposed and which is subject on its upper side to atmospheric pressure and on its lower side to the pressure in a chamber 19 leading through a suitable pipe 20 to a port 21 in the casing 5 of the door valve which when the safety pedal 4 is in its released position establishes communication through a suitable cavity 22 in the rotary valve 6 of the door controlling valve device between the pipe 20 and the pipe 2, whereas when the safety pedal is depressed, communication is established between the pipe 20 and an atmospheric port.

The diaphragm 18 of the control valve device 17 is arranged to operate a valve 23 controlling communication between the chamber 19 below the diaphragm 18 and a lower chamber 24 which communicates by means of the pipe 16 with the cylinder 7 of the door engine. The lower chamber 24 of the control valve device is arranged to communicate, when the valve 23 is seated on its upper seat, with a pipe 25 leading through the double check valve device 26 past the unseated check valve 60 to the brake cylinder 1 or cylinders, while, when the diaphragm 18 is in its lower position and the valve 23 seated on its lower seat, communication between the lower chamber 24 of the control valve and the check valve device 26 is effected through a restricted aperture 45 only.

The diaphragm 18 of the control valve device is arranged to be maintained in its raised position by means of a suitable spring 27 so long as atmospheric pressure obtains in the upper chamber 19 of the valve, the diaphragm 18 being moved to its lower position either when this upper chamber is subject to vacuum or is mechanically moved to its lower position by a cam or projection 28 engaging with the head of the diaphragm when the change speed lever 29 of the vehicle is in its neutral position, i. e., when the locking latch 53 carried by the lever is in engagement with a latch plate 53 within a notch 54. The cam or projection 28 is provided on a boss or collar 30 carried by the change speed lever and containing a notch or recess 31 within which the collar is adapted to be engaged by a locking bolt 32 operated by the safety pedal 4 in such a manner that when the change speed lever 29 is in its neutral position and the safety pedal 4 is released, the locking bolt 32 enters the notch 31, and prevents the change speed lever 29 from being moved into a gear position until the safety pedal 4 has been depressed.

The pipe 16 leading from the cylinder 7 of the door engine is also connected by means of a branch pipe 33 to the pipe 2 through a safety cock 34 which is normally closed, but is adapted to be opened by the passengers in case of emergency for the purposes hereinafter explained.

The operation of the apparatus is as follows:—

While the vehicle is stationary with the engine running, and lever 29 in neutral position the control of the doors is effected solely by the driver, who, by releasing the safety pedal 4, permits the rotary valve 6 of the door controlling valve device to move to a position in which the cylinder 7 of the door engine is in communication with the intake manifold 49 of the engine through the control valve device 17, the valve 23 of which, is held away from its upper seat in these circumstances owing to the diaphragm 18 being held in its lower position by the cam 28 operated by the change speed lever 29.

By depressing the safety pedal 4, the door controlling valve device is moved to its other position in which the cylinder 7 of the door engine is placed in communication with the atmosphere while the cylinder 8 of the door engine is placed in communication with the intake manifold 49 of the engine so that the door engine in these circumstances is actuated to close the door 11 or doors.

It will thus be evident that if the driver releases the safety pedal 4, the door or doors of the vehicle are opened by the door engine and can only be reclosed by the depression of the safety pedal 4. Furthermore, until this safety pedal 4 is depressed, the change speed lever 29 is locked in its neutral position so that the vehicle cannot be started into motion. Again, so long as the safety pedal 4 is released, the brake cylinder 1 is in communication, through the double check valve device 26 and the restricted port 45 in the lower chamber 24 of the control valve device 17, with the pipe 2 by way of the port 21 and the cavity 22 in the door controlling valve device so that the brakes of the vehicle are held applied and cannot be released until the safety pedal is depressed. It will here be noted that with the chamber 24 thus connected to the pipe 2, a partial vacuum is created in the chamber of the double check valve device which contains the check valve 60 so that fluid at atmospheric pressure from the brake cylinder 1 will cause the check valve 60 to unseat and the check valve 56 to seat, thus establishing the communication through the check valve device from the pipe 25 to the pipe 55 leading from the brake cylinder 1.

In order to start the vehicle into motion, it is necessary for the driver to depress the safety pedal 4 so as to release the change speed lever 29 as above explained and when this lever is moved away from its neutral position, the diaphragm 18 of the control valve device 17 is allowed to move to its raised position under the action of the controlling spring 27, the upper chamber 19 of the control valve device having been placed in communication with the atmosphere through the door controlling valve device. The depression of the safety pedal 4 prior to the movement of the change speed lever 29 has, as above explained, caused the door closing cylinder 8 of the door engine to be connected to the pipe 2 through the door controlling valve device so that the doors of the vehicle are closed and the cylinder 7 of the door engine being simultaneously placed in communication with the atmosphere, the lower chamber 24 of the control valve device is also at atmospheric pressure and by releasing the ordinary brake pedal 3, assuming this has been depressed, the driver is permitted to effect the release of the brakes.

During normal running, the control of the brakes is effected by the ordinary brake pedal 3 through the double check valve device 26, pipe 38 and pipe 2 leading to the induction pipe or intake manifold 49 of the engine, but in the event of the driver, for any reason, releasing the safety pedal 4, under these conditions, the door controlling valve device is correspondingly actuated and the upper chamber 19 of the control valve device 17 is placed in communication with the pipe 2 through the pipe 20 and port 21, cavity 22 and elongated port 40 in the door controlling valve device. As a result, the diaphragm 18 of the control valve device 17 moves to its lower position under the atmospheric pressure on the upper surface of the diaphragm and establishes communication between the opening cylinder 7 of the door engine and the pipe 2 through the control valve device 17.

However, as the change speed lever 29, under normal running conditions, is not in its neutral position in which the end of the bolt 32 is opposite the notch 31 in the boss or collar 30, the end of the bolt 32 abuts against the periphery of the boss or collar 30 and, in these circumstances, the cavity 14 in the rotary valve 6 is in communication with the pipe 2 through the elongated port 40 which bridges the cavities 14 and 22, the cavity 14 bridging the ports 13 and 40. Thus the door closing cylinder 8 of the door engine is in communication through the port 13, cavity 14, elongated port 40 and pipe 13 with the pipe 2 leading to the intake manifold 49 of the engine.

The door closing or locking mechanism is thus released as both cylinders 7 and 8 are in communication with the pipe 2 and the doors may readily be opened by hand under these conditions.

Simultaneously, the vacuum obtaining in the upper and lower chambers of the control valve device 17 causes an automatic application of the brakes through the double check valve device 26 and the restricted port 45. It will thus be seen that in the event of the driver, during running, releasing the safety pedal 4 for any reason, the brakes are automatically applied and the door or doors of the vehicle are balanced.

In case of emergency, an application of the brakes can be effected even while the safety pedal 4 is depressed if the safety cock 34 is operated by a passenger, since under these conditions, although the valve 23 is on its upper seat, the lower chamber 24 of this valve is placed in communication with the pipe 2 through the safety cock 34, with the result, that vacuum conditions will be established in the brake cylinder 1 or cylinders, while as regards the door engine, the cylinder 7 thereof, which was previously in communication with the atmosphere, will be placed in communication through the safety cock 34 with the pipe 2. As a result, both cylinders of the door engine will be subject to vacuum, so that the doors will be balanced and can be opened by hand.

In order to render the closing action of the door engine free from shock, the piston 10, in the cylinder 8, is preferably provided with a spring controlled projection 35 adapted, when the piston has moved through a portion of its travel towards its fully closed position, to close or to obstruct the opening 36 from the cylinder leading to the pipe 12 which in turn leads to the door controlling valve device, communication between the interior of the cylinder and this pipe being thereafter effected through a restricted by-pass 37 thereby retarding the closing action during the latter part thereof as will be readily understood.

If desired, the vacuum reservoir 46, which is normally maintained at the desired degree of vacuum by the suctional action of the engine may be omitted.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a safety control equipment for a vehicle, the combination with vacuum controlled means operative to effect the application and release of the brakes, of a brake valve device for normally controlling the operation of said means, a door for the vehicle, vacuum controlled means for controlling the operation of said door, and valve means separate from the brake valve device for normally controlling the operation of the second mentioned vacuum controlled means and operative upon release by the operator for controlling the operation of the first mentioned vacuum controlled means for effecting an application of the brakes.

2. In a safety control equipment for a vehicle, the combination with vacuum controlled means operative to effect the application and release of the brakes, of a foot controlled brake valve device for normally controlling the operation of said means, a door for the vehicle, vacuum door controlling means, and a foot controlled valve device for normally controlling the operation of the door controlling means and operative upon release by the operator for controlling the operation of the vacuum controlled means to effect an application of the brakes and for controlling the operation of the door controlling means to balance said door.

3. In a safety control equipment for an automotive vehicle, the combination with vacuum controlled brake and door controlling mechanism, of a change speed lever having a neutral position and a power transmitting position, and means operative upon release by the operator when said lever is in neutral position for effecting an application of the brakes and the opening of the door of the vehicle and operative when said lever is in power transmitting position for effecting an application of the brakes and the balancing of the door.

4. In a safety control equipment for an automotive vehicle, the combination with vacuum controlled brake and door controlling mechanism, of a change speed lever having a neutral position and a power transmitting position, and means operative upon release by the operator when said lever is in neutral position for effecting an application of the brakes, the opening of the door of the vehicle and the locking of said lever in its neutral position.

5. In a safety control equipment for a vehicle, the combination with a brake and door controlling mechanism, of a change speed lever having a neutral position and a power transmitting position, and means normally subject to an operator's foot pressure and operative upon the relief of said pressure when said lever is in neutral position for effecting an application of the brakes and the opening of the door of the vehicle and for effecting an application of the brakes and the balancing of the door when said lever is in its power transmitting position.

6. In a safety control equipment for a vehicle, the combination with a vacuum brake cylinder, of two valve devices each operative to control the expelling of fluid from the brake cylinder to effect an application of the brakes and the admission of fluid to the brake cylinder to effect the release of the brakes, and means for rendering one of said valve devices ineffective to control the flow of fluid from and to the brake cylinder when the other of said valve devices is operated to control the brakes.

7. In the safety control equipment for a vehicle, the combination with vacuum controlled means operative to effect the application and release of the brakes, of a brake valve device for normally controlling the operation of said means, means operative upon release by the operator for controlling the operation of said vacuum controlled means for effecting an application of the brakes, and means operative by a passenger for also controlling the operation of said vacuum controlled means for effecting an application of the brakes.

8. In a safety control equipment for a vehicle, the combination with vacuum controlled means operative to effect the application and release of the brakes, of a foot controlled brake valve device for normally controlling the operation of said means, a door for the vehicle, vacuum door controlling means, a foot controlled valve device for normally controlling the operation of the door controlling means and operative upon release by the operator for controlling the operation of the vacuum controlled means to effect an application of the brakes and for controlling the operation of the door controlling means to balance said door, and means adapted to be operated by a passenger for also controlling the operation of the vacuum controlled means to effect an application of the brakes and for controlling the operation of the door controlling means to balance the door.

9. In a safety control equipment for an automotive vehicle, the combination with vacuum controlled brake and door controlling mechanism, of a change speed lever having a neutral position and a power transmitting position, means operative upon release by the operator when said lever is in power transmitting position for effecting an application of the brakes and for balancing said door, and means adapted to be operated by a passenger for effecting an application of the brakes and the balancing of said door when said lever is in power transmitting position and the first mentioned means is maintained depressed by the operator.

10. In a safety control equipment for a vehicle, the combination with vacuum controlled means operative to effect the application and release of the brakes, of a brake valve device for normally controlling the operation of said means, a door for the vehicle, means normally depressed for maintaining said door closed and operative upon release by the operator for effecting an application of the brakes and the balancing of said door, and valve means for preventing the release of the brakes upon depressing the door controlling means to close said door.

11. In a safety control equipment for a vehicle, the combination with a vacuum source, of a vacuum brake cylinder, a door for the vehicle, a vacuum controlled door engine for controlling the operation of said door engine, a change speed lever having a neutral position and a power transmitting position, a door controlling valve device normally maintained by an operator in position to establish communication from said source of vacuum to the door closing side of said engine and to establish communication from the atmosphere to the door opening side of said engine for maintaining the door closed and operative upon release by the operator when said lever is in neutral position for establishing communication from said vacuum source to the door opening side of said engine and for establishing communication from the atmosphere to the door closing side of the engine to open said door and operative when said lever is in power transmitting position for establishing communication from the vacuum source to both sides of the engine to balance the door.

12. In a safety control equipment for a vehicle, the combination with a vacuum source, of a vacuum brake cylinder, a door for the vehicle, a vacuum controlled door engine for controlling the operation of said door engine, a change speed lever having a neutral position and a power transmitting position, a door controlling valve device normally maintained by an operator in position to establish communication from said source of vacuum to the door closing side of said engine and to establish communication from the atmosphere to the door opening side of said engine for maintaining the door closed and operative upon release by the operator when said lever is in neutral position for establishing communication from said vacuum source to the door opening side of said engine and for establishing communication from the atmosphere to the door closing side of the engine to open said door and operative when said lever is in power transmitting position for establishing communication from the vacuum source to both sides of the engine to balance the door, and means operative into engagement with said lever upon the operation of said valve device for limiting the movement of the valve device.

13. In a safety control equipment for a vehicle, the combination with a vacuum source, of a vacuum brake cylinder, a door for the vehicle, a vacuum controlled door engine for controlling the operation of said door engine, a change speed lever having a neutral position and a power transmitting position, a door controlling valve device normally maintained by an operator in position to establish communication from said source of vacuum to the door closing side of said engine and to establish communication from the atmosphere to the door opening side of said engine for maintaining the door closed and operative upon release by the operator when said lever is in neutral position for establishing communication from said vacuum source to the door opening side of said engine and for establishing communication from the atmosphere to the door closing side of the engine to open said door and operative when said lever is in power transmitting position for establishing communication from the vacuum source to both sides of the engine to balance the door, and means operative into engagement with said lever upon the operation of said valve device for limiting the movement of the valve device and for locking said lever in its neutral position.

14. In a safety control equipment for a vehicle, the combination with a change speed lever having a neutral position and a power transmitting position, of a door for the vehicle, means operative when said lever is in neutral position for opening said door, and means for maintaining said lever in neutral position until the first mentioned means is operated to close said door.

15. In a safety control equipment for a vehicle, the combination with a change speed lever having a neutral position and a power transmitting position, of a door for the vehicle, means operative when said lever is in neutral position for opening said door, and a member movable into locking engagement with said lever when said means is operated to open said door and movable out of locking engagement with said lever when said means is operated to close said door.

16. In a safety control equipment for a vehicle, the combination with a change speed lever having a neutral position and a power transmitting position, of a door for the vehicle, means operative when said lever is in neutral position for opening said door, a foot controlled pedal for controlling the operation of said means, and means movable by said pedal into locking engagement with said lever when said pedal is operated to door open position.

17. In a safety control equipment for a vehicle, the combination with a change speed lever having a neutral position and a power transmitting position, of a door for the vehicle, means operative to open and close said door, a valve device for controlling the operation of said means, a pedal for operating said valve device, a member movable by said pedal into locking engagement with said lever when the lever is in neutral position and the pedal operated to door open position and movable by said pedal out of locking engagement with the lever when said pedal is moved to door closed position.

In testimony whereof I have hereunto set my hand this 11th day of June 1930.

<div style="text-align: center;">ANSELME NEVEU.</div>